US009456451B2

(12) United States Patent
Livet et al.

(10) Patent No.: US 9,456,451 B2
(45) Date of Patent: *Sep. 27, 2016

(54) METHOD AND SYSTEM FOR MANAGING RADIO RESOURCES IN A TIME-SLOTTED COMMUNICATION SYSTEM

(75) Inventors: Catherine Livet, Montreal (CA); Guang Lu, Montreal (CA); Shamim Akbar Rahman, Montreal (CA); Maged Zaki, Pierrefonds (CA)

(73) Assignee: Intel Corporation, Santa Clara, CA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 11/654,765

(22) Filed: Jan. 17, 2007

(65) Prior Publication Data

US 2007/0115893 A1     May 24, 2007

Related U.S. Application Data

(63) Continuation of application No. 10/886,735, filed on Jul. 8, 2004, now Pat. No. 7,170,877.

(60) Provisional application No. 60/485,763, filed on Jul. 9, 2003.

(51) Int. Cl.
| H04W 72/08 | (2009.01) |
| H04W 72/10 | (2009.01) |
| H04W 72/04 | (2009.01) |

(Continued)

(52) U.S. Cl.
CPC ............ *H04W 72/087* (2013.01); *H04L 47/14* (2013.01); *H04L 47/24* (2013.01); *H04W 28/18* (2013.01); *H04W 72/0446* (2013.01); *H04W 72/10* (2013.01)

(58) Field of Classification Search
USPC .......................................... 370/337
See application file for complete search history.

(56) References Cited

U.S. PATENT DOCUMENTS

| 6,031,827 A | 2/2000 | Rikkinen et al. |
| 6,115,390 A | 9/2000 | Chuah |

(Continued)

FOREIGN PATENT DOCUMENTS

| EP | 1 098 542 | 5/2001 |
| JP | 63-180229 | 7/1988 |

(Continued)

OTHER PUBLICATIONS

Office Action for U.S. Appl. No. 10/886,735 mailed Jan. 11, 2005, 5 pages.

(Continued)

*Primary Examiner* — Steven Kelley
(74) *Attorney, Agent, or Firm* — Blakely, Sokoloff, Taylor & Zafman LLP

(57) ABSTRACT

A method and system for managing radio resources in a time-slotted wireless communication system is based on the quality of service (QoS) information of a user. A plurality of time slots of a radio resource are sorted into a plurality of different categories, such as high QoS time slots, high capacity time slots, and balanced time slots. Each category is associated with a different level of QoS. QoS information with respect to a user is obtained in response to a radio resource request received from the user. The user is associated with a particular category of time slots based on the QoS information of the user.

6 Claims, 2 Drawing Sheets

(51) Int. Cl.
*H04W 28/18* (2009.01)
*H04L 12/801* (2013.01)
*H04L 12/851* (2013.01)

(56) References Cited

U.S. PATENT DOCUMENTS

| | | | |
|---|---|---|---|
| 6,181,684 B1 * | 1/2001 | Turcotte et al. | 370/332 |
| 6,201,971 B1 * | 3/2001 | Purnadi et al. | 455/450 |
| 6,240,079 B1 * | 5/2001 | Hamalainen et al. | 370/337 |
| 6,327,361 B1 | 12/2001 | Harshavardhana et al. | |
| 6,449,588 B1 | 9/2002 | Bowman-Amuah | |
| 6,463,470 B1 | 10/2002 | Mohaban et al. | |
| 6,564,061 B1 * | 5/2003 | Guo et al. | 455/452.1 |
| 6,594,241 B1 * | 7/2003 | Malmlof | 370/329 |
| 6,636,500 B2 * | 10/2003 | Krishnamoorthy et al. | 370/347 |
| 6,701,149 B1 | 3/2004 | Sen et al. | |
| 6,813,255 B1 * | 11/2004 | Goderis et al. | 370/335 |
| 6,865,185 B1 | 3/2005 | Patel et al. | |
| 6,879,834 B2 * | 4/2005 | Virtanen | 455/452.2 |
| 6,907,243 B1 | 6/2005 | Patel | 455/442 |
| 6,940,824 B2 * | 9/2005 | Shibutani | 370/252 |
| 6,947,750 B2 * | 9/2005 | Kakani et al. | 455/452.2 |
| 7,058,398 B2 * | 6/2006 | Livet et al. | 455/422.1 |
| 7,089,017 B2 * | 8/2006 | Chen et al. | 455/453 |
| 7,095,732 B1 | 8/2006 | Watson, Jr. | 370/346 |
| 7,130,639 B2 * | 10/2006 | Lee et al. | 455/452.2 |
| 7,269,159 B1 * | 9/2007 | Lai | 370/352 |
| 7,269,423 B2 * | 9/2007 | Lee et al. | 455/452.1 |
| 7,308,282 B2 * | 12/2007 | Chen et al. | 455/522 |
| 7,342,911 B2 * | 3/2008 | Tolli et al. | 370/345 |
| 7,406,098 B2 * | 7/2008 | Taneja et al. | 370/468 |
| 7,453,801 B2 * | 11/2008 | Taneja et al. | 370/230 |
| 7,499,453 B2 * | 3/2009 | Carlson et al. | 370/395.2 |
| 7,505,397 B2 * | 3/2009 | Lee et al. | 370/208 |
| 7,577,118 B2 * | 8/2009 | Haumonte et al. | 370/330 |
| 7,778,644 B2 * | 8/2010 | Choi | H04W 72/087 455/422.1 |
| 7,953,885 B1 * | 5/2011 | Devireddy et al. | 709/238 |
| 8,831,026 B2 * | 9/2014 | Iyengar | H04L 67/322 370/395.43 |
| 2002/0055360 A1 * | 5/2002 | Chen et al. | 455/452 |
| 2002/0105906 A1 * | 8/2002 | Marjelund et al. | 370/229 |
| 2002/0126675 A1 | 9/2002 | Yoshimura et al. | |
| 2003/0031201 A1 | 2/2003 | Choi | |
| 2003/0054829 A1 | 3/2003 | Moisio | |
| 2003/0117964 A1 | 6/2003 | Chen et al. | |
| 2003/0148764 A1 * | 8/2003 | Kelley | 455/434 |
| 2003/0179769 A1 * | 9/2003 | Shi et al. | 370/442 |
| 2003/0198207 A1 | 10/2003 | Lee et al. | |
| 2003/0216144 A1 * | 11/2003 | Roese et al. | 455/456.1 |
| 2004/0253940 A1 * | 12/2004 | Andrews et al. | 455/405 |
| 2006/0120282 A1 * | 6/2006 | Carlson et al. | 370/229 |

FOREIGN PATENT DOCUMENTS

| | | |
|---|---|---|
| JP | 10-190621 | 7/1998 |
| JP | 2000-253017 | 9/2000 |
| JP | 2001-078260 | 3/2001 |
| JP | 2002-186036 | 6/2002 |
| JP | 2003-070053 | 3/2003 |
| JP | 2003-179966 | 6/2003 |
| KR | 10-2001-0009510 | 2/2001 |
| KR | 2003-13545 | 2/2003 |
| KR | 10-2003-0048240 | 6/2003 |
| WO | 01/045445 | 6/2001 |
| WO | 03/073702 | 9/2003 |

OTHER PUBLICATIONS

Office Action for U.S. Appl. No. 10/886,735 mailed Jul. 12, 2005, 10 pages.
Office Action for U.S. Appl. No. 10/886,735 mailed May 30, 2006, 13 pages.
Final Office Action for U.S. Appl. No. 10/886,735 mailed Nov. 29, 2005, 12 pages.
Final Office Action for U.S. Appl. No. 10/886,735 mailed Feb. 16, 2006, 14 pages.
Notice of Allowance for U.S. Appl. No. 10/886,735 mailed Sep. 27, 2006, 7 pages.

* cited by examiner

METHOD AND SYSTEM FOR MANAGING RADIO RESOURCES IN A TIME-SLOTTED COMMUNICATION SYSTEM

CROSS REFERENCE TO RELATED APPLICATION

This application is a continuation of U.S. patent application Ser. No. 10/886,735 filed on Jul. 8, 2004, which claims the benefit of U.S. Provisional Application No. 60/485,763 filed on Jul. 9, 2003, which are incorporated by reference as if fully set forth.

FIELD OF INVENTION

The present invention is related to a wireless communication system. More particularly, the present invention is related to a method and system for managing radio resources in a time-slotted wireless communication system based on quality of service (QoS) information of a user.

BACKGROUND

In conventional wireless communication systems, the demand for radio resources often exceeds their availability. Many schemes have been developed to share available radio resources among a plurality of users. The efficiency of the radio resource management (RRM) algorithms enhances the capacity of such systems.

Various Time Division Duplex (TDD) communication schemes exist today. The benefits of TDD systems include efficient and flexible use of bandwidth. For example, a channel can be configured to be either an uplink or downlink channel at any given time, based on traffic demands. However, resource management in a TDD system is challenging. As traffic patterns change rapidly over time, it is difficult to make optimal resource management decisions. Some of the resource management issues in a TDD system include the amount of bandwidth to assign a user, and the number of time slots to configure for uplink and downlink communications. Although various QoS schemes are currently known, most schemes depend on assigning a static QoS class to a given user and then forcing the system to act accordingly.

A method and system for more efficiently managing radio resources in a time-slotted communication system are desired.

SUMMARY

The present invention relates to radio resource management in a time-slotted system, such as a TDD or Time Division Multiple Access (TDMA) system. The system of the present invention designates a particular level of QoS and capacity to each time slot. In a preferred embodiment of the present invention, time slots (and users, geographic regions, and applications) are designated into three categories. In a first category designation, system capacity is a secondary concern, whereas QoS is considered as the most important issue. In a second category designation, system capacity is considered as more important than QoS. In a third category designation, the QoS and system capacity are both considered to be relatively equal in terms of importance.

A Radio Resource Management (RRM) function assigns the appropriate designation to a number of time slots based on statistical information of traffic patterns. The RRM function can use the admission control, congestion control, handover, user link maintenance and real time (RT) or non-real time (NRT) packet switching algorithm as a basis for allocating time slots for a particular user.

In one embodiment, a system receives a request for radio resources from a user. In response to the request, the system allocates a particular time slot to the user according to the user's QoS information obtained from a core network.

QoS criterion includes a status of user subscription, nature of user application, information regarding geographic region where the user requests radio resource, or the like. The system controls initial allocation of radio resources to a particular user based on the category designation associated with the user.

After initial allocation is established, the system constantly monitors the traffic conditions. If the system detects traffic congestion at time slots having a higher level of QoS, the system may increase the number of time slots having the higher level of QoS, and decrease the number of time slots having the lower level of QoS.

BRIEF DESCRIPTION OF THE DRAWING

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
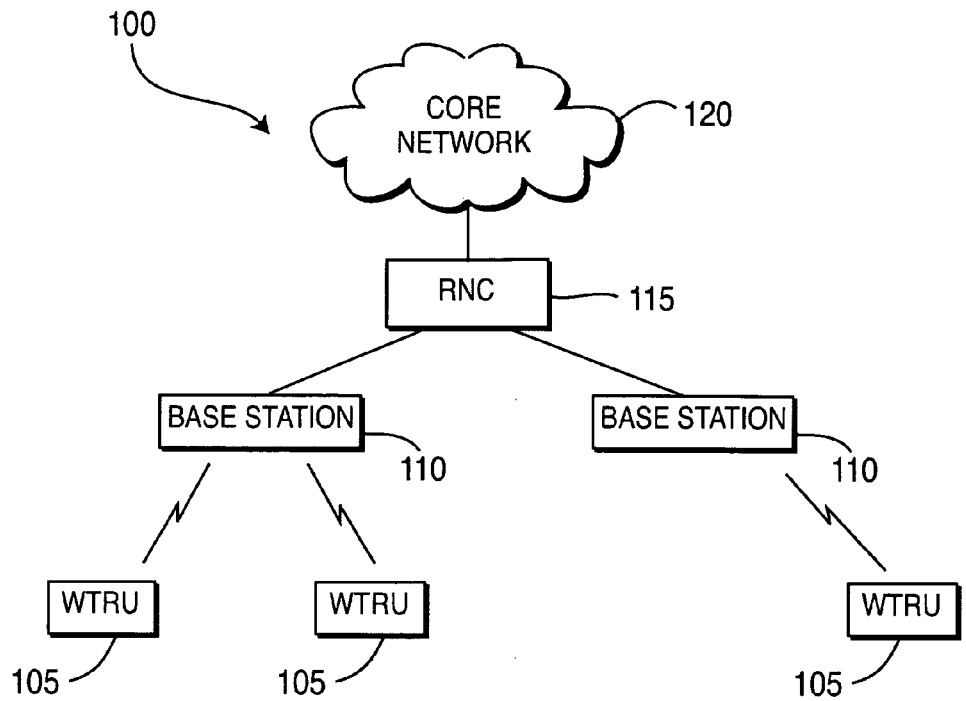
FIG. 1 is a block diagram of a time-slotted communication system in accordance with the present invention.

The present invention will be described with reference to the drawing figures wherein like numerals represent like elements throughout. Hereafter, a base station includes but is not limited to a Node-B, site controller, access point or any other type of interfacing device in a wireless environment.

FIG. 1 is a block diagram of a wireless communication system 100, wherein a plurality of WTRUs 105 communicate with base stations 110. The base stations 110 are controlled by a radio network controller (RNC) 115. The RNC 115 is connected to a core network 120. Either the RNC 115 or the base stations 110 include a means for sorting a plurality of time slots of a radio resources into a plurality of different categories, and a means for mapping a user to a particular designation of time slots based on QoS information of the user which is obtained from a core network 120, as described in more detail below.

In a time-slotted communication system, a communication is transmitted over time slots. One or more time slots are designated to a particular user for either uplink or downlink communication. The system 100 of the present invention assigns one of a plurality of designations to time slots based upon the QoS of a user. In a preferred embodiment, the system 100 uses three designations: high QoS time slots, high capacity time slots, and balanced time slots. It should be understood that any number of designations may be used, and the title of the designations is simply for illustration of the preferred embodiment of the present invention. Accordingly, although three designations will be described hereinafter, more or less designations may be used. The priority scheme of the present invention may be used for either an uplink or a downlink channel.

Communication parameters, such as maximum delay, signal-to-interference ratio, packet error rate, and bit error rate, are defined differently for each designation of time slots. Therefore, a different level of QoS is provided to a time slot having a different designation.

High QoS time slots provide the highest QoS. As such, system capacity is a secondary concern for RRM, and is considered after QoS.

High capacity time slots provide only a minimum QoS. System capacity is a primary concern for RRM, and considered prior to QoS for high capacity time slots.

The QoS of balanced time slots falls between the high QoS time slots and the high capacity time slots. For RRM, system capacity and QoS are considered to be of relatively equal importance for balanced time slots.

RRM adjusts dynamically the parameters for each designation of time slot based on the traffic state. For example, in case of traffic congestion or lack of radio resources, communication parameters for balanced time slots are first adjusted to provide a minimum QoS. If congestion persists, calls from high capacity time-slots are dropped. Therefore, high QoS time slots are typically not adversely affected by traffic congestion.

The system may also designate time slots as RT slots or NRT slots. RT slots are more suitable for voice application, while NRT slots are more suitable for packet data applications. RT slots and NRT slots are differently controlled in terms of RRM. Communication parameters are defined differently for RT and NRT time slots. Therefore, different levels of QoS are provided to RT and NRT slots.

The system initially maps a user to a particular time slot designation based on QoS criterion and, thereafter, controls radio resources based on the same criterion. The QoS classification of the user depends on the overall QoS policy applied to the network. The QoS classification may include the status of the user's subscription, geographic information, the nature of the user's application, a QoS request, or the like. For example, in a commercial network, a user with a high level subscription is assigned to a high QoS time slot, irrespective of the QoS requirement of his communication, whereas a user with a low level subscription requesting a high QoS service is assigned to a balanced time slot.

In a preferred embodiment of the present invention, users are classified into three classes: a high QoS service subscriber, a high capacity service subscriber, and a balanced service subscriber. It should be understood that this classification is merely for illustration of the preferred embodiment of the present invention, and any number or title may be used. With some exceptions, high QoS time slots are assigned to high QoS service subscribers, balanced time slots are assigned to balanced service subscribers, and high capacity time slots are assigned to high capacity service subscribers. The system 100 controls the initial allocation of radio resources to a particular user based on the status of the subscription of the user.

The system 100 may also use operation and maintenance (OAM) information to make a decision of initial time slot assignment. For example, the operator could specify that certain radio access bearers should be sent to certain slots, such as all voice calls and high rate data calls (e.g. >384 kbps) should be sent to high QoS time slots, all medium rate data calls (e.g. 124 kbps-384 kbps) should be sent to balanced time slots, and all low rate data calls (e.g. <124 kbps) should be sent to high capacity time slots.

The system 100 may associate a particular geographic region to one of a plurality of time slot designations. For example, the system 100 may associate an airport or a train station to high QoS time slots. Only high QoS time slots are available for communication to and from these regions. Therefore, only a high QoS service subscriber can access radio resources in these regions. If a balanced service subscriber or a high capacity service subscriber desires to make a call in a region designated as a high QoS zone, they must obtain a special grant to promote them to a high QoS service subscriber temporarily before making a call.

The system 100 may designate time slots based on the applications that the user uses. For example, a 911 call can be seen as a high QoS application. Therefore, any user who requests a 911 service may access a radio resource as a high QoS service subscriber, even though the user is not a high QoS service subscriber.

Different RRM algorithms are applied to different time slots. The RRM function assigns the appropriate number of time slots to each designation of time slots based on statistical information of traffic patterns. The RRM function can use the admission control, congestion control, handover, user link maintenance and RT or NRT packet switching algorithm.

Figure 2:
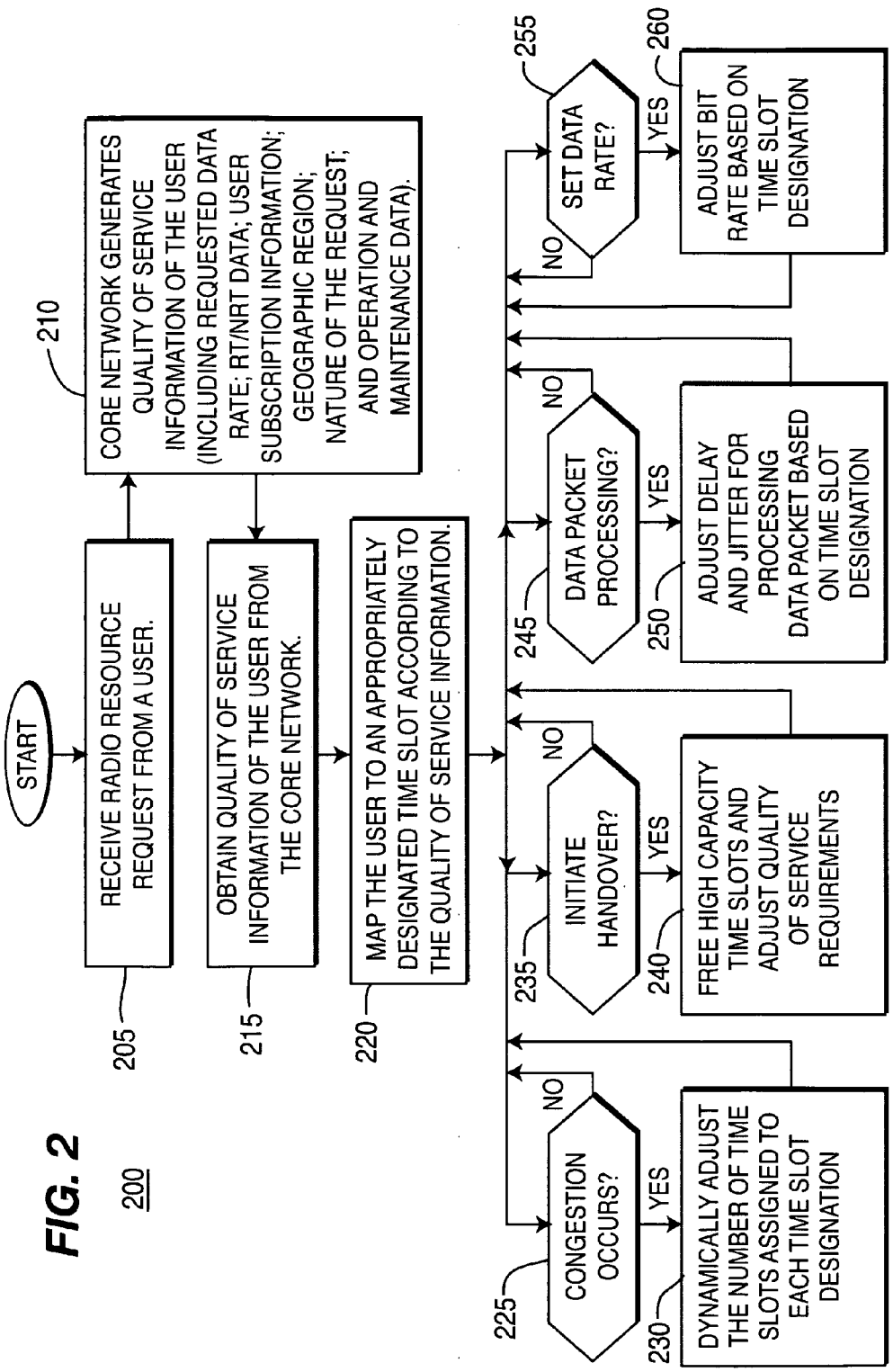
FIG. 2 is a flow diagram of a process including method steps for managing radio resources and monitoring various conditions in accordance with the present invention.

FIG. 2 is a flow diagram of a process 200 including method steps for managing radio resources and monitoring various traffic conditions in accordance with the present invention. In step 205, the system 100 of FIG. 1 receives a radio resource request from a user of a WTRU 105. The radio resource request accompanies QoS information related to the request, the status of user subscription, the place of origination of the request, and the application that the user is using. In step 210, the core network 120 generates QoS information related to the user. In step 215, the QoS information is obtained from the core network 120. In step 220, the system 100 maps the user to an appropriately designated time slot (e.g., a high QoS time slot, a balanced time slot, a high capacity time slot, or the like) based on the QoS information of the user. As previously described, with some exceptions, high QoS time slots are assigned to high QoS service subscribers, balanced time slots are assigned to balanced service subscribers, and high capacity time slots are assigned to high capacity service subscribers. The system 100 controls the initial allocation of radio resources to a particular user based on the status of the subscription of the user.

After initial allocation is completed, the system 100 constantly monitors traffic status and, thereafter, controls radio resources according to a priority scheme in accordance with the present invention. Once the system 100 detects the occurrence of congestion, i.e., lack of radio resources (step 225), the system 100 dynamically adjusts the number of time slots assigned to each time slot designation (step 230). For example, if congestion occurs with high QoS time slots, the system 100 increases the number of high QoS time slots available and decreases the number of high capacity time slots available and, if necessary, the number of balanced time slots available after exhaustion of the available high capacity time slots. This may require the termination of calls or preventing a new access to high capacity time slots. Dropping calls or packets is considered to be a last resort. If congestion occurs with balanced time slots, the system 100 increases the number of balanced time slots available, and decreases the number of high capacity time slots available. However, the number of high QoS time slots is not adversely affected in this situation.

The system 100 may control handover according to the priority scheme of the present invention (step 235). Mobile units are permitted to rove among a plurality of cells. When a mobile unit crosses the boundary between two cells, a handover process is initiated. If there are not enough resources in the target cell, handover is not accomplished and a call might be dropped. In such situation, the system 100 frees high capacity time slots to be able to accept incoming high QoS users, and balanced requests are accepted by adjusting the QoS requirements in order to not congest the system 100, whereas high capacity requests would be rejected (step 240).

The system 100 may set the priority for NRT packet scheduling according to the priority scheme of the present invention (step 245). For example, users assigned to high QoS time slots are provided with the lowest delay and jitter for scheduling of data packets, users assigned to balanced time slots are provided with medium delay and jitter for data packet delivery, and users assigned to high capacity time slots are provided with the largest delay and jitter for transmission of data packets (step 250).

The system 100 may maintain link status with different data rates for each time slot designation (step 255). For example, high QoS time slots are given a guaranteed bit rate plus a predefined margin, and balanced time slots are given a guaranteed bit rate, and high capacity time slots are not guaranteed for a bit rate, but the actual connection may drop below the provided rate (step 260). If the system 100 detects a decrease in the data rate for a particular time slot designation, the system 100 may change the number of time slots of the designation according to the priority scheme of the present invention.

Figure 3:
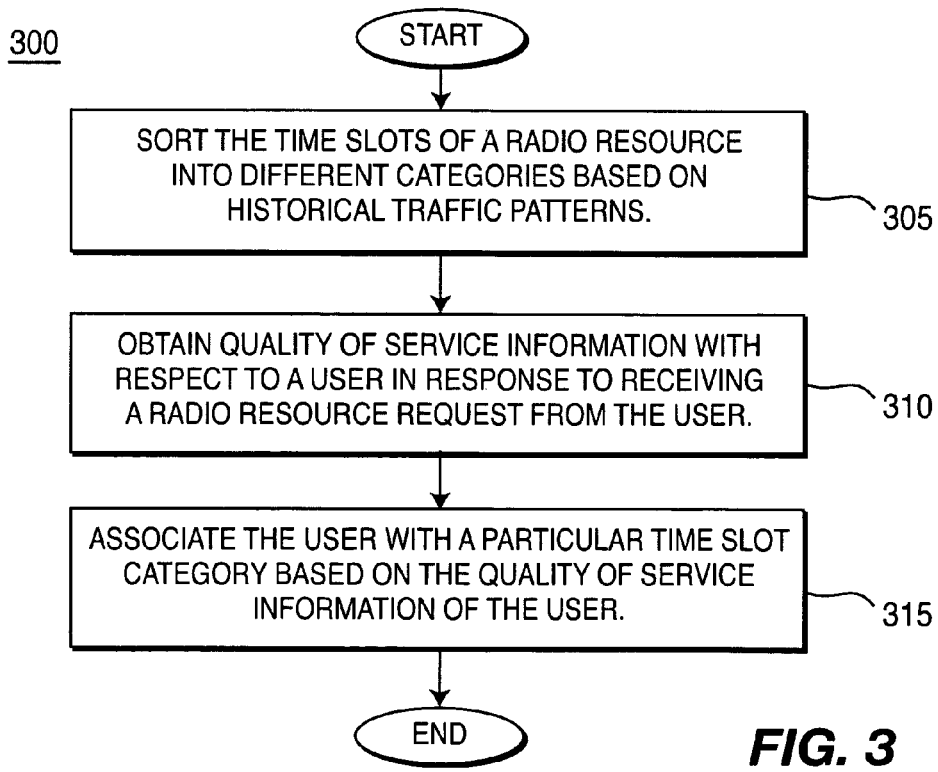
FIG. 3 is a flow diagram of a process including method steps of sorting time slot categories and associating a user with a particular time slot category in accordance with the present invention.

FIG. 3 is a flow diagram of a process 300 including method steps of sorting time slot categories and associating a user with a particular time slot category in accordance with the present invention. Radio resources are managed in a time-slotted wireless communication system 100 by sorting a plurality of time slots of the radio resource into a plurality of different categories, each category being associated with a different level of quality of service (QoS) (step 305). QoS information with respect to a user is obtained in response to a radio resource request received from the user (step 310). The user is then associated with a particular category of time slots based on the QoS information of the user (step 315).

While this invention has been particularly shown and described with reference to preferred embodiments, it will be understood by those skilled in the art that various changes in forms and details may be made therein without departing from the scope of the invention as described above.

What is claimed is:

1. A method of managing radio resources in time division duplex wireless communications comprising:
   receiving a radio resource request from a user;
   obtaining a quality of service (QoS) classification of the user, wherein the QoS classification is based on a user's subscription status, geographic information, and a user's subscriber classification;
   defining a plurality of time slot designations, wherein each time slot designation has an associated QoS level and capacity;
   mapping the user to one of the time slot designations based on the QoS classification of the user; and
   determining whether to initiate handover (HO) in response to the user crossing a boundary between cells, wherein HO is performed if a target cell provides sufficient resources and, if the target cell does not provide sufficient resources to service a high-QoS user in response to detecting congestion in the high-QoS time slot designation, freeing high capacity time slots to be able to accept incoming high-QoS users, wherein incoming balanced user requests are accepted by adjusting QoS requirements in order to not congest the system, and incoming high capacity requests are rejected in response to detecting congestion in the high-QoS time slot designation, and determining whether to adjust a data rate and high QoS time slots are given a guaranteed bit rate plus a predefined margin, balanced time slots are given a guaranteed bit rate, and high capacity time slots are not guaranteed a bit rate, wherein:
   on a condition that congestion is detected on the mapped time slot designation, dynamically adjusting a number of time slots assigned to each time slot designation, wherein if congestion occurs with high QoS time slots, increasing the number of high QoS time slots available and decreasing the number of high capacity time slots available and, if necessary, the number of balanced time slots available after exhaustion of the available high capacity time slots, and if congestion occurs with balanced time slots, increasing the number of balanced time slots available, and decreasing the number of high capacity time slots available,
   on a condition that HO initiation is determined, releasing high capacity time slots and adjusting QoS requirements of balanced time slot requests;
   on a condition that the processing of data packets is required, adjusting delay and jitter for processing data packets, based on the time slot designation, and
   on condition that the data rate adjustment is required, adjusting the bit rate based on the time slot designation.

2. The method of claim 1, wherein the plurality of time slot designations includes at least one of a high QoS time slot, a high capacity time slot, a balanced time slot, a real time (RT) time slot and a non-real time (NRT) time slot.

3. A radio network controller (RNC) for managing radio resources in time division duplex wireless communications:
   the RNC to receive a radio resource request from a user and to obtain a quality of service (QoS) classification of the user, wherein the QoS classification is based on a user's subscription status, geographic information, and a user's subscriber classification;
   the RNC to map the user to one of a plurality time slot designations based on the QoS classification;
   the RNC to determine whether to initiate handover (HO) in response to the user crossing a boundary between cells, wherein the HO is performed if a target cell provides sufficient resources and, if the target cell does not provide sufficient resources to service a high-QoS user in response to detecting congestion in the high-QoS time slot designation, to free high capacity time slots to be able to accept incoming high-QoS users;
   the RNC to accept incoming balanced user requests by adjusting QoS requirements in order to not congest the system, and further wherein incoming high capacity requests are rejected in response to detecting congestion in the high-QoS time slot designation; and
   the RNC to determine whether to adjust a data rate, wherein high QoS time slots are given a guaranteed bit rate plus a predefined margin, wherein balanced time slots are given a guaranteed bit rate, and further wherein high capacity time slots are not guaranteed a bit rate on the following conditions:

on a condition that congestion is detected on the mapped time slot designation, the RNC dynamically adjusting a number of time slots assigned to each time slot designation, wherein if congestion occurs with high QoS time slots, increasing the number of high QoS time slots available and decreasing the number of high capacity time slots available and, if necessary, the number of balanced time slots available after exhaustion of the available high capacity time slots, and if congestion occurs with balanced time slots, increasing the number of balanced time slots available, and decreasing the number of high capacity time slots available, on a condition that HO initiation is determined, the RNC releasing high capacity time slots and adjusting QoS requirements of balanced time slot requests, on a condition that the processing of data packets is required, the RNC adjusting delay and jitter for processing data packets, based on the time slot designation, and on condition that the data rate adjustment is required, the RNC adjusting the bit rate based on the time slot designation.

4. The RNC of claim 3, wherein the plurality of time slot designations includes at least one of a high QoS time slot, a high capacity time slot, a balanced time slot, a real time (RT) time slot and a non-real time (NRT) time slot.

5. A base station for managing radio resources in time division duplex wireless communications:

the base station including a receiver to receive a radio resource request from a user and to obtain a quality of service (QoS) classification of the user, wherein the QoS classification is based on a user's subscription status, geographic information, and a user's subscriber classification;

the base station to map the user to one of a plurality of time slot designations based on the QoS classification;

the base station to determine whether to initiate handover (HO) in response to the user crossing a boundary between cells, wherein the HO is performed if a target cell provides sufficient resources and, if the target cell does not provide sufficient resources to service a high-QoS user in response to detecting congestion in the high-QoS time slot designation, to free high capacity time slots to be able to accept incoming high-QoS users;

the base station to accept incoming balanced user requests by adjusting QoS requirements in order to not congest the system, and further wherein incoming high capacity requests are rejected in response to detecting congestion in the high-QoS time slot designation; and the base station to determine whether to adjust a data rate, wherein high QoS time slots are given a guaranteed bit rate plus a predefined margin, wherein balanced time slots are given a guaranteed bit rate, and further wherein high capacity time slots are not guaranteed a bit rate on the following conditions:

on a condition that congestion is detected on the mapped time slot designation, the base station dynamically adjusting a number of time slots assigned to each time slot designation, wherein if congestion occurs with high QoS time slots, increasing the number of high QoS time slots available and decreasing the number of high capacity time slots available and, if necessary, the number of balanced time slots available after exhaustion of the available high capacity time slots, and if congestion occurs with balanced time slots, increasing the number of balanced time slots available, and decreasing the number of high capacity time slots available, on a condition that HO initiation is determined, the base station releasing high capacity time slots and adjusting QoS requirements of balanced time slot requests, on a condition that the processing of data packets is required, the base station adjusting delay and jitter for processing data packets, based on the time slot designation, and on condition that the data rate adjustment is required, the base station adjusting the bit rate based on the time slot designation.

6. The base station of claim 5, wherein the plurality of time slot designations includes at least one of a high QoS time slot, a high capacity time slot, a balanced time slot, a real time (RT) time slot and a non-real time (NRT) time slot.

* * * * *